(12) United States Patent
Xu et al.

(10) Patent No.: US 11,190,487 B2
(45) Date of Patent: Nov. 30, 2021

(54) IDENTIFYING SECURITY RISKS AND ENFORCING POLICIES ON ENCRYPTED/ENCODED NETWORK COMMUNICATIONS

(71) Applicant: Palo Alto Networks, Inc., Santa Clara, CA (US)

(72) Inventors: Zhi Xu, Cupertino, CA (US); Yangjie Cheng, Fremont, CA (US); Cong Zheng, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 199 days.

(21) Appl. No.: 15/908,512

(22) Filed: Feb. 28, 2018

(65) Prior Publication Data

US 2019/0268305 A1     Aug. 29, 2019

(51) Int. Cl.
| | | |
|---|---|---|
| *H04L 29/06* | (2006.01) | |
| *H04L 29/12* | (2006.01) | |
| *G06F 16/28* | (2019.01) | |

(52) U.S. Cl.
CPC ........ *H04L 63/0236* (2013.01); *G06F 16/285* (2019.01); *H04L 61/1511* (2013.01); *H04L 61/2007* (2013.01); *H04L 63/1425* (2013.01); *H04L 63/1433* (2013.01); *H04L 63/20* (2013.01); *H04L 69/16* (2013.01)

(58) Field of Classification Search
CPC . H04L 63/20; H04L 63/1425; H04L 63/1433; H04L 63/0236; H04L 63/0227; H04L 61/1511; H04L 61/2007; H04L 61/6009; H04L 69/16; G06F 16/285

USPC ............................................................. 726/1
See application file for complete search history.

(56) References Cited

U.S. PATENT DOCUMENTS

| | | | | |
|---|---|---|---|---|
| 6,141,686 | A * | 10/2000 | Jackowski | ............ H04L 41/065 709/206 |
| 8,009,566 | B2 * | 8/2011 | Zuk | ..................... H04L 63/0227 370/235 |
| 8,204,984 | B1 * | 6/2012 | Aziz | ................... H04L 63/0227 709/224 |
| 8,856,910 | B1 * | 10/2014 | Rostami-Hesarsorkh | ................... G06F 21/554 726/11 |
| 9,047,441 | B2 * | 6/2015 | Xie | ......................... G06F 21/00 |
| 9,177,293 | B1 * | 11/2015 | Gagnon | ............... G06Q 10/107 |
| 9,253,068 | B1 * | 2/2016 | Wu | ......................... H04L 29/06 |
| 9,686,291 | B2 | 6/2017 | Antonakakis | |
| 9,917,852 | B1 | 3/2018 | Xu | |

(Continued)

OTHER PUBLICATIONS

Trevisan, Martino, et al. "Towards web service classification using addresses and dns." 2016 International Wireless Communications and Mobile Computing Conference (IWCMC). IEEE, 2016. (Year: 2016).*

(Continued)

*Primary Examiner* — Syed A Zaidi
(74) *Attorney, Agent, or Firm* — Van Pelt, Yi & James LLP

(57) ABSTRACT

Network traffic associated with a communication between a client device and a resource is monitored. At least of the monitored traffic is encrypted. The encrypted traffic is categorized. One example way to categorize the encrypted traffic includes using Domain Name System (DNS) query information. A policy is applied to the communication based at least in part on the categorization of the encrypted traffic.

27 Claims, 8 Drawing Sheets

(56) References Cited

U.S. PATENT DOCUMENTS

| | | | |
|---|---|---|---|
| 2007/0160200 A1* | 7/2007 | Ishikawa | H04L 63/0428 380/30 |
| 2008/0235507 A1* | 9/2008 | Ishikawa | H04L 63/0428 713/150 |
| 2010/0095367 A1* | 4/2010 | Narayanaswamy | H04L 63/20 726/12 |
| 2010/0138910 A1* | 6/2010 | Aldor | H04L 63/0236 726/14 |
| 2010/0199325 A1* | 8/2010 | Raleigh | H04L 63/0428 726/3 |
| 2010/0250918 A1* | 9/2010 | Tremblay | H04L 63/0428 713/150 |
| 2012/0060142 A1* | 3/2012 | Fliess | G06F 11/3428 717/102 |
| 2012/0096261 A1* | 4/2012 | Ko | H04L 63/0236 713/168 |
| 2012/0304244 A1* | 11/2012 | Xie | G06F 21/53 726/1 |
| 2013/0117282 A1 | 5/2013 | Mugali, Jr. | |
| 2013/0247201 A1* | 9/2013 | Alperovitch | H04L 63/145 726/24 |
| 2013/0263263 A1* | 10/2013 | Narkolayev | G06F 21/51 726/22 |
| 2013/0298192 A1* | 11/2013 | Kumar | G06F 21/52 726/3 |
| 2014/0157414 A1 | 6/2014 | Antonakakis | |
| 2014/0310394 A1 | 10/2014 | Wood | |
| 2018/0006912 A1* | 1/2018 | Sokolik | H04L 43/062 |
| 2019/0182290 A1* | 6/2019 | Haddad | H04L 63/1416 |

OTHER PUBLICATIONS

NPL Search Results (Year: 2019).*
NPL Search Terms (Year: 2020).*
NPL Search Terms (Year: 2021).*
Bermudez et al., "DNS to the rescue: discerning content and services in a tangled web", In Proceedings of the 2012 Internet Measurement Conference (IMC '12). ACM, New York, NY, USA, 413-426, 2012.
Bilge et al., "Exposure: Finding Malicious Domains Using Passive DNS Analysis", NDSS, 2011.
Chatzis et al., "Email Worm Detection by Wavelet Analysis of DNS Query Streams", CICS May 2009.
Plonka et al., "Context-aware clustering of DNS query traffic", In Proceedings of the 8th ACM SIGCOMM conference on Internet measurement (IMC '08). ACM, New York, NY, USA, 217-230, 2008.
Wu et al., "Identifying the Use of Data/Voice/Video-Based P2P Traffic by DNS-Query Behavior," 2009 IEEE International Conference on Communications, Dresden, pp. 1-5, 2009.
Zdrnja et al., "Passive Monitoring of DNS Anomalies", In: M. Hämmerli B., Sommer R. (eds) Detection of Intrusions and Malware, and Vulnerability Assessment. DIMVA 2007. Lecture Notes in Computer Science, vol. 4579. 2007.

* cited by examiner

IDENTIFYING SECURITY RISKS AND ENFORCING POLICIES ON ENCRYPTED/ENCODED NETWORK COMMUNICATIONS

BACKGROUND OF THE INVENTION

Software applications are increasingly making use of encryption techniques to protect communications (e.g., between client devices and external resources). Use of such techniques can help provide security/confidentiality for such communications (e.g., against malicious eavesdroppers). Unfortunately, use of such techniques also makes it more difficult for legitimate entities, such as enterprises, to enforce policies pertaining to such communications.

BRIEF DESCRIPTION OF THE DRAWINGS

Various embodiments of the invention are disclosed in the following detailed description and the accompanying drawings.

DETAILED DESCRIPTION

Figure 1:
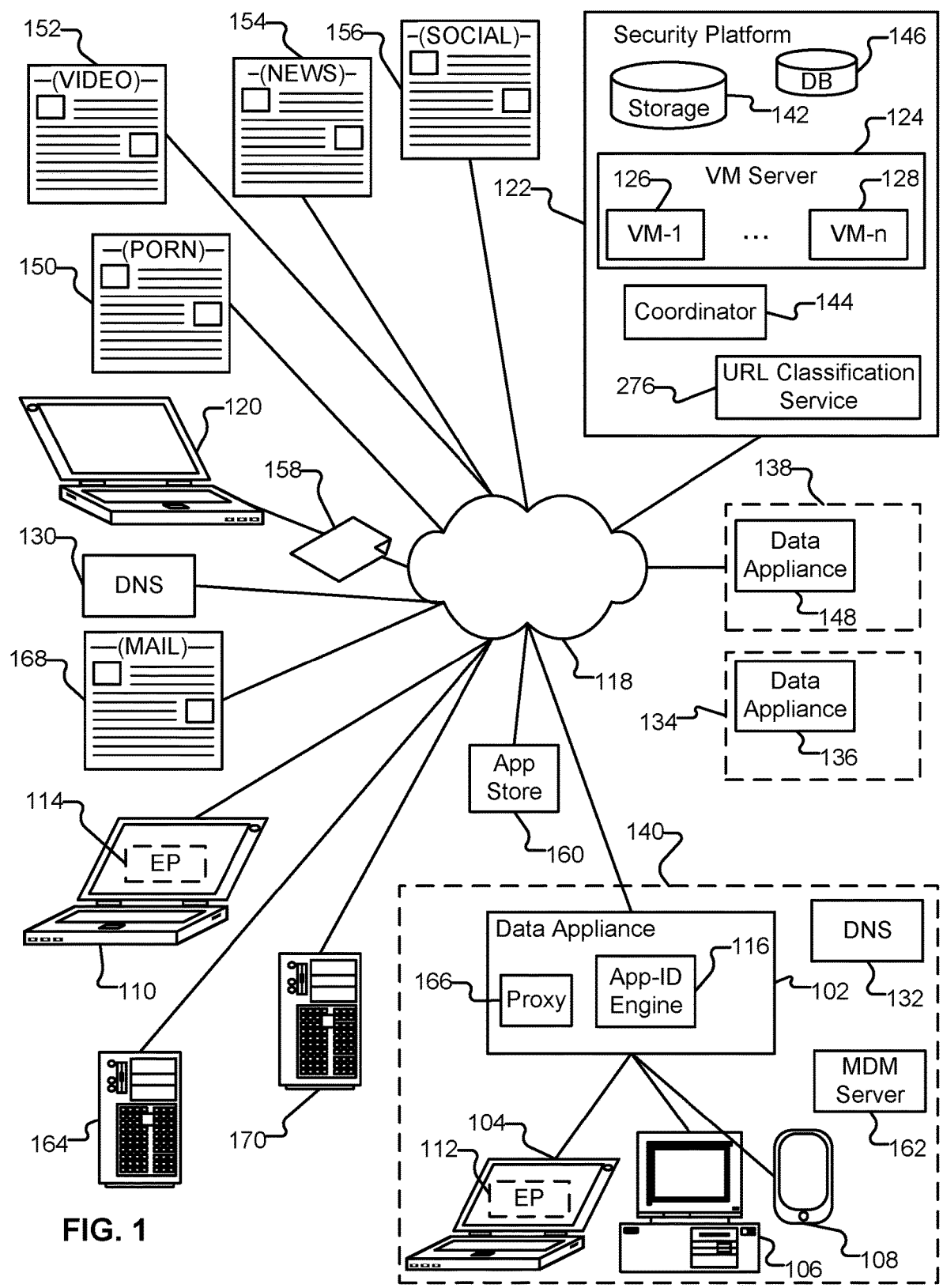
FIG. 1 illustrates an example of an environment in which policies are enforced against communications, including encrypted/encoded communications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

OVERVIEW

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Example Environment

FIG. 1 illustrates an example of an environment in which policies are enforced. Included in the environment are two Domain Name System (DNS) servers (130 and 132). Typically, when attempting to access a URL, a web browser (e.g., executing on a client device) forwards a request to a DNS server (e.g., DNS server 130) to resolve the domain name of the URL into a corresponding (Internet Protocol (IP) address. In response to receiving a valid IP address for a requested domain name, the client can connect to a corresponding content server (site 152) using the IP address to request a desired resource. The content server responds with the requested resource if the requested resource is available at the content server or responds with an error message or with a redirect to another content server if the requested resource is not available at the content server.

Also shown in FIG. 1 is an example enterprise network 140 which belongs to an entity hereinafter referred to as ACME Corporation. Enterprise network 140 includes an enterprise DNS server 132. Enterprise DNS server 132 is configured to resolve enterprise domain names into IP addresses, and is further configured to communicate with one or more external DNS servers (e.g., DNS server 130) to resolve domain names. Also included within enterprise network 140 are example client devices 104-108, which are a laptop computer, a desktop computer, and a tablet (respectively). Laptop 104 and desktop computer 106 are owned by ACME, and tablet 108 is personally owned by an ACME employee hereinafter referred to as Alice. Client device 110 is a laptop computer located outside of enterprise network 140.

Client devices, such as client devices 104-110 can each execute a variety of applications. The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement software development kit (SDK) or library embedded within the calculator app).

"Malware" as used herein refers to an application that engages in behaviors, whether clandestinely or not (and whether illegal or not), of which a user does not approve/ would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer.

Other forms of malware can also be mitigated using the techniques described herein (e.g., ransomware). And, while examples provided throughout the Specification generally refer to malicious applications, techniques described herein can also be used in various embodiments with respect to other kinds of applications (e.g., adware, goodware, etc.). In some cases, an end user of an application (e.g., Alice) may approve of functionality provided by an application, while another entity (e.g., ACME) may not. As two examples, Alice may intentionally have gambling applications or pornographic-themed applications installed on her tablet 108. In contrast, ACME may have corporate policies prohibiting employees from using enterprise network 140 for such applications. As will be described in more detail below, ACME can enforce policies against the use of such applications within enterprise network 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.).

Data appliance 102 (also included within enterprise network 140) is configured to enforce policies regarding communications between client devices, such as client devices 104 and 106, and nodes outside of enterprise network 140 (e.g., reachable via one or more external networks collectively depicted as network cloud 118). One example of a policy is a rule prohibiting any access to site 150 (a pornographic website) by any client inside enterprise network 140. Another example of a policy is a rule prohibiting access to social networking site 156 by clients between the hours of 9 am and 6 pm. Yet another example of a policy is a rule allowing access to video streaming website 152, subject to a bandwidth or other consumption constraint. Yet another example of a policy is one that logs the time spent by employees using social networking sites (e.g., where there is an understanding that employees will sometimes visit such sites throughout the workday, but should limit such activities to fifteen minutes per day). Policies can be made to apply to all devices equally, and can also be applied at more granular levels. For example, access to social networking site 156 can be permitted to anyone in the ACME marketing department (e.g., users having associated group identifiers indicating their affiliation with the marketing department), and unfettered bandwidth for use with video streaming website 152 can be granted to specific users (e.g., the CEO), to groups of users (e.g., the ACME sales department), and/or to individual/groups of clients (e.g., prohibiting access to video streaming site 152 on production servers). Access to sites (e.g., news site 154) can be explicitly permitted (e.g., a rule allowing access to site 154 via URL ("www.examplenews.com") or category ("NEWS")), and can also be permitted by virtue of not being prohibited (e.g., "access to any site not prohibited is allowed").

Other types of policies can also be enforced, such as ones governing traffic shaping, quality of service, and/or routing (e.g., with respect to a given domain, a pattern including a domain (e.g., *.examplenews.com), a category associated with a domain, other hostname-associated information (e.g., URL), IP address range, etc.). Yet other examples of policies include security policies such as ones requiring the scanning for threats in incoming (and/or outgoing) email attachments, screening of website content, scanning files exchanged through instant messaging programs, and/or other file transfers. In some embodiments, data appliance 102 is also configured to enforce policies with respect to traffic that stays within enterprise network 140.

In various embodiments, data appliance 102 executes a DNS proxy service 166 (described in more detail below). When a client device (e.g., client device 108) attempts to communicate with a network resource (e.g., video streaming website 152), a DNS request is received by DNS proxy service 166, which provides a response back to client device 108. As applicable, the response is cached by data appliance 102.

In various embodiments, other devices are also included in enterprise network 140, such as a mobile device management (MDM) server 162, which is in communication with data appliance 102. MDM server 162 communicates with mobile devices to determine device status and to report (e.g., periodically) such mobile device status information to data appliance 102. MDM server 162 can be configured to report the presence of malicious applications installed on client devices, and/or can be configured to receive indications of which applications are malicious (e.g., from data appliance 102, from security platform 122, or combinations thereof). In some embodiments, data appliance 102 is configured to enforce policies against client devices based on information received from MDM server 162. For example, if a client device is determined to have malware installed on it (or other types of unapproved applications), data appliance 102 (working in cooperation with MDM server 162) can deny the client device access to certain enterprise resources (e.g., an Intranet) while allowing other client devices (which do not have malware installed on them) access to those resources.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
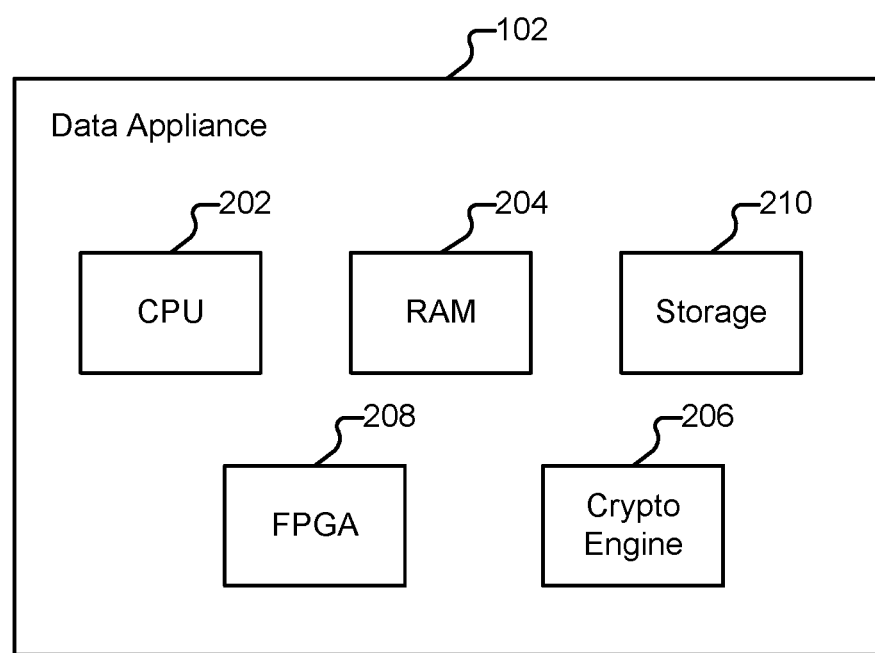
FIG. 2A is a functional diagram of hardware components included in an embodiment of a data appliance.

An embodiment of a data appliance is shown in FIG. 2A. The example shown is a representation of physical/hardware components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disk drives or solid state storage units), which can be used to store policy and other configuration information, as well as other information such as signatures and hostname/URL categorization information. In various embodiments, data appliance 102 stores (whether in RAM 204, storage 210, and/or in other appropriate locations) information used in monitoring enterprise network 140 and implementing disclosed techniques. Examples of such information include application identifiers, content identifiers, user identifiers, requested URLs, IP address mappings, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client devices 104 or 110) by software executing on the client device (e.g., endpoint protection applications 112 and 114).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine 116 which is configured to identify an application (e.g., using various application signatures for identifying applications based on packet flow analysis). For example, application identification engine 116 can determine what type of traffic a session involves, such as Web Browsing—Social Networking; Web Browsing—News; SSH; and so on.

Figure 2B:
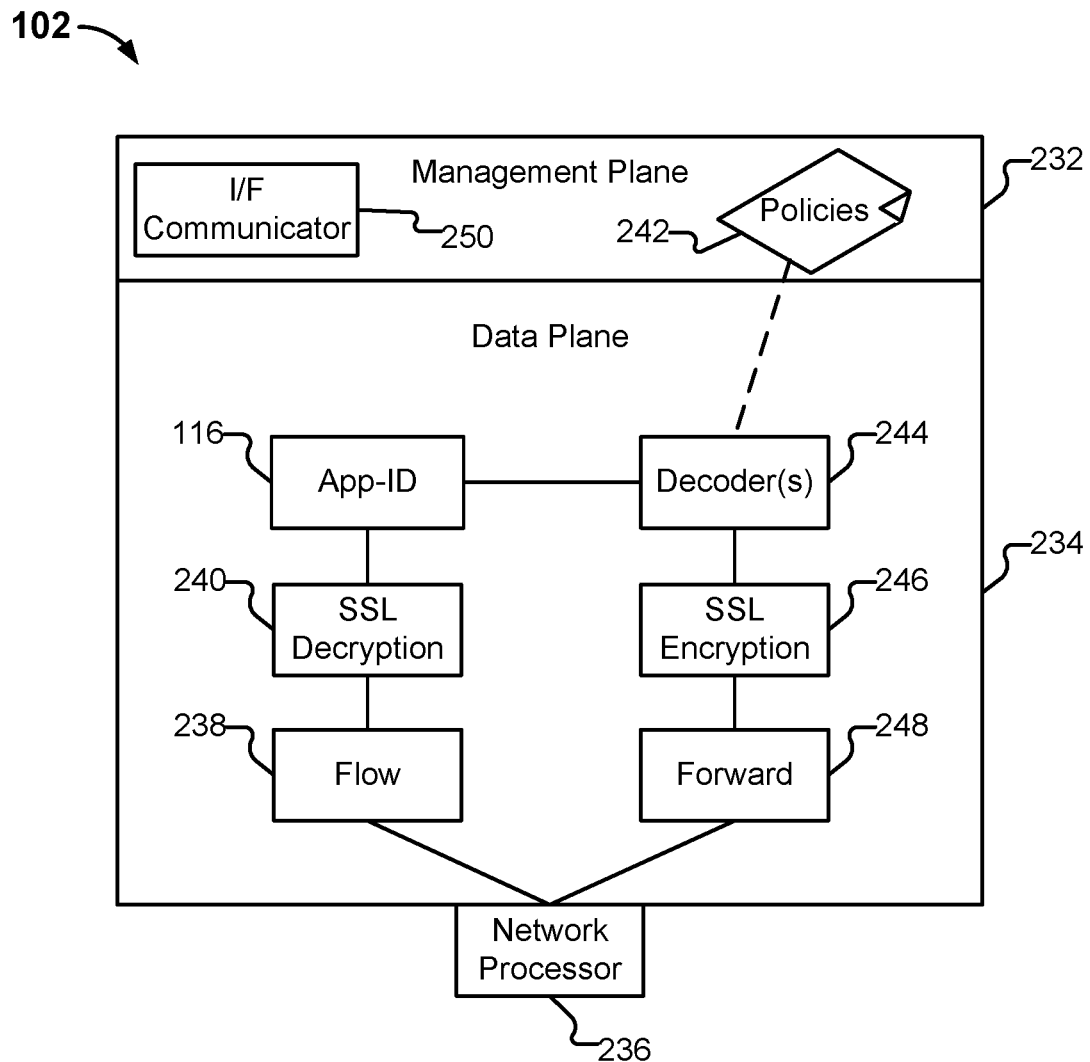
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 116 is configured to determine what type of traffic a session involves. As one example, application identification engine 116 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244. Based on the determination made by application identification engine 116, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown, policies 242 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. As also shown in FIG. 2B, an interface (I/F) communicator 250 is provided for management communications (e.g., via (REST) APIs, messages, or network protocol communications or other communication mechanisms.

Figure 2C:
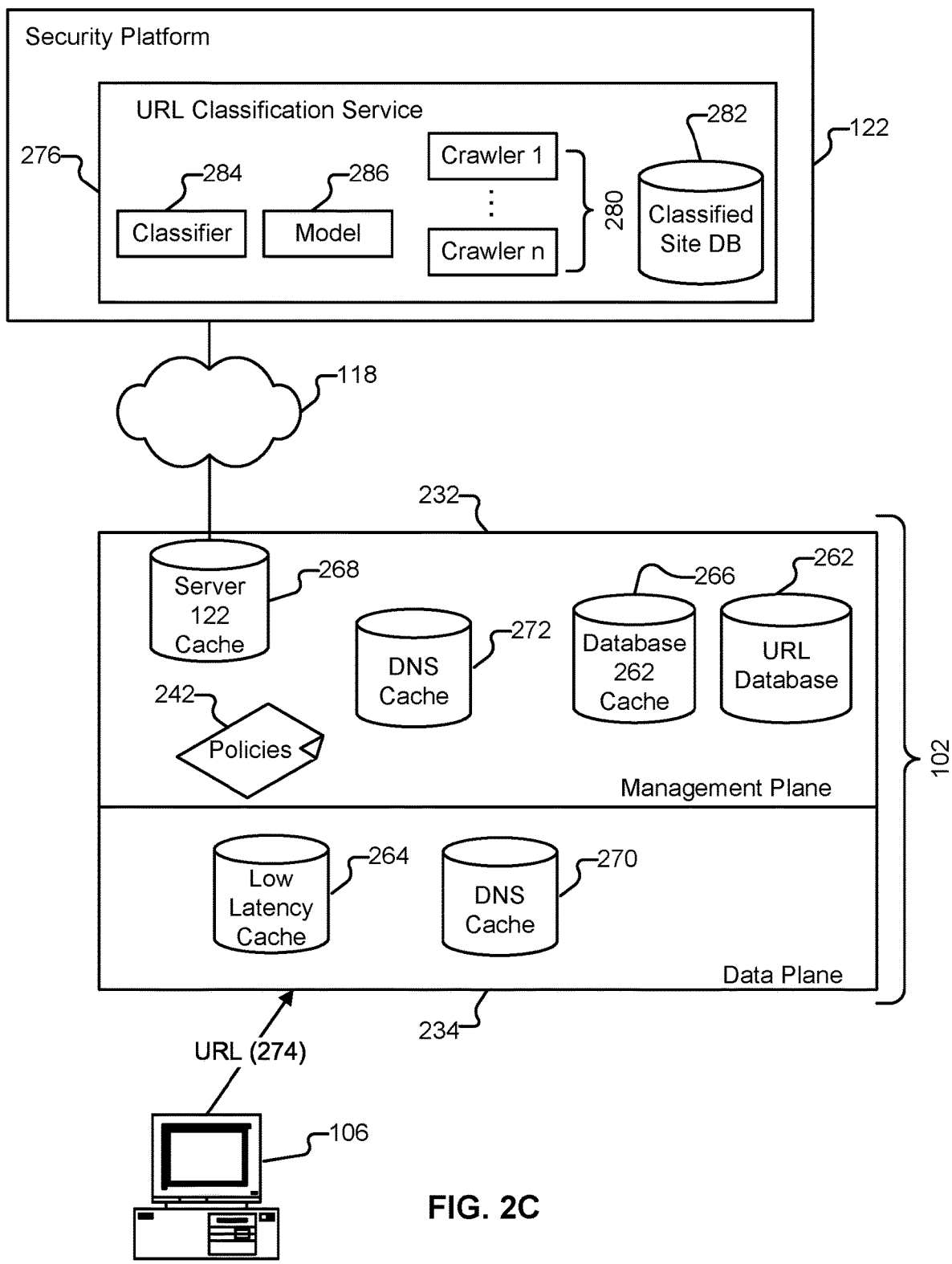
FIG. 2C illustrates an embodiment of a data appliance.

FIG. 2C illustrates an embodiment of a data appliance. As previously explained, in various embodiments, data appliance 102 includes a management plane 232 and a data plane 234. The management plane is responsible for managing user interactions, such as by providing one or more user interfaces for configuring policies (242), reporting problems, and viewing log data. The data plane is responsible for managing data, such as by performing packet processing (e.g., to extract URLs) and session handling. In various embodiments, a scheduler is responsible for managing the scheduling of requests (e.g., as presented by data plane 234 to management plane 232, or as presented by management plane 232 to a remote security platform 122).

URL Filtering

As mentioned above, one task performed by data appliance 102 is URL filtering. Specified in data appliance 102 is a set of policies 242, some of which govern the types of websites that ACME employees may access, and under what conditions. As one example, included in data appliance 102 is a policy that permits employees to access news-related websites. Another policy included in data appliance 102 prohibits, at all times, employees from accessing pornographic websites. Also included in data appliance 102 is a database (262) of URLs and associated categories (e.g., with bing.com being categorized as a "search engine" and with gmail.com being categorized as "web mail"). Other information can also be associated with the URLs in database 262 instead of or in addition to category information, and that other information can be used in conjunction with policy enforcement.

In some embodiments, database 262 (or at least some portions thereof) is provided by a third party, such as through a subscription service. In such a scenario, it is possible that instead of the URLs being directly stored in database 262, a transformation is applied to the URLs prior to storage. As one example, MD5 hashes of URLs can be stored in database 262, rather than the URLs themselves. The URLs stored in database 262 (or transformations thereof) represent the top n URLs for which access is most likely to be sought by users of client devices, such as client device 104, where n can be configured based on the computing and other resources available to data appliance 102. As one example, an embodiment of database 262 includes 20 million URLs and is stored in storage 210. Database 262 can be periodically refreshed/maintained, such as by security platform 122 transmitting daily (or another timescale) database updates to data appliance 102 (e.g., as a content package).

In various embodiments, data appliance 102 includes various caches (e.g., 264-272), loaded into RAM 204. In some embodiments, all or some of caches 264-272 are omitted from data appliance 102 and the processing described herein is adapted accordingly. In other embodiments, additional caches are included in data appliance 102, as applicable. Additional details regarding components shown in FIG. 2C are provided below.

When a user of client device 106 (an employee referred to hereinafter as "Bob") attempts to engage in activities such as web surfing, communications from and to client device 106 pass through data appliance 102. As one example, suppose Bob has launched a web browser application on client device 106 and would like to visit an arbitrary web page. Data appliance 102 is configured to evaluate the URL of the site Bob would like to visit (e.g., URL 274) and determine whether access should be permitted.

Suppose Bob would like to visit site 154, the website of a national newspaper, and enters that URL into his browser ("www.examplenews.com"). In some embodiments, the URL (274) is evaluated by data appliance 102 as follows. In the first stage of the evaluation, the data plane (234) consults cache 264 for the presence of URL 274 (the results of which are indicative of whether data appliance 102 has previously received a request to access site 154 within cache resource constraints). If the URL is present in cache 264, the associated category that is also stored in cache 264 is used to enforce any applicable policies 242 (e.g., allowing Bob access to site 154). If the URL is not present in cache 264, a temporary entry is inserted into cache 264 indicating that the URL is being resolved. As one example, a URL being resolved is assigned a temporary category of "UNRESOLVED." Additional requests received by data appliance 102 for access to site 154 (e.g., received from another user such as "Charlie," a user of client device 104) will be queued pending the resolution. In various embodiments, a timeout condition is placed on UNRESOLVED entries included in cache 264, such that if the entry is not updated within a specified period of time, the entry is removed.

Assuming URL 274 remains unresolved, data plane 234 sends a request to management plane 232 for an evaluation of URL 274. URL 274 is transformed as applicable (e.g., an MD5 hash of URL 274 is computed). For the remainder of the discussion of this example, no distinction will be made between a URL and the MD5 (or other transformation) of a URL, to aid in clarity. It is to be assumed that if database 262 stores MD5 hashes, the queries performed against (and corresponding operations) it will be performed using MD5 (or other applicable) transformations of URLs.

In some embodiments, cache 266 is evaluated for the presence of URL 274 (indicative of whether database 262 was previously queried for URL 274 within cache resource constraints). Suppose URL 274 is not present in cache 266. A query of database 262 is performed using URL 274. If it is assumed that URL 274 is present in database 262, the corresponding category NEWS is returned and ultimately provided to data plane 234, which will update the entry in cache 264 by changing the UNRESOLVED category to NEWS. The category will be used by the firewall to enforce any applicable rules. In this case, for example, Bob's attempt to access URL 274 with his browser would be permitted (his session would not be terminated by data appliance 102), because his request is associated with an attempt to access a NEWS site, which is a permissible use. Cache 266 is also updated to include the returned category and URL 274 (i.e., its MD5 hash).

Now suppose that a query of database 262 for URL 274 fails. The next phase of evaluation performed by the management plane is to consult cache 268 to see if URL 274 is present therein. Cache 268 is associated with queries performed by data appliance 102 against a set of one or more remote URL classification services. As with the previous phases, if URL 274 is present in cache 268, the corresponding category (e.g., "NEWS") will be returned as a result and can be used by the firewall in policy enforcement (and included in cache 264). If URL 274 is also absent in cache 268, one or more remote URL classification services, such as URL classification service 276, are queried.

In some embodiments, the URL classification service is an Amazon Cloud URL query server, which queries URL category information using a Trie structure lookup. In some embodiments, the URL classification service is made available by the provider of the contents of database 262, and contains URL information that supplements the information included in database 262 (e.g., by including many millions of additional URLs and corresponding categories). As one example, URL classification service 276 can be provided by security platform 122 (e.g., as component 276). A URL classification service can also be under the control of the owner of data appliance 102 or any other appropriate party. Further, a set of multiple URL classification services can be queried by data appliance 102, whether in parallel, in sequence (e.g., if a first queried URL classification service has no results, data appliance 102 contacts a different URL classification service), selectively, etc.

In various embodiments, URL classification service 276 is implemented using commodity server-class hardware. URL classification service 276 can also be constructed using a scalable, elastic architecture, and may comprise several distributed components, including components provided by one or more third parties (e.g., using Amazon Web Services, Microsoft Azure, and/or Google Cloud Platform). Further, when URL classification service 276 is referred to as performing a task, such as storing data or processing data, it is to be understood that a sub-component or multiple subcomponents of URL classification service 276 (whether individually or in cooperation with third party components) may cooperate to perform that task. Functionality described herein as being provided by URL classification service 276 can be implemented in a variety of ways, including as a set of one or more scripts (e.g., written in Java, python, etc., as applicable).

In the event that URL 274 is also absent from URL classification service 276 (and any additional URL services available to data appliance 102 as applicable), a category of UNKNOWN will be returned and appropriate policies applied, based on the category, such as by blocking access to URL 274. Cache 264 can also be updated by switching the temporary category of UNRESOLVED to UNKNOWN. As with cache 266, cache 268 is updated based on results returned by URL classification service 276. In some embodiments, URLs with UNKNOWN categorization have a timeout, thus allowing for resolution of the categorization during a subsequent request.

Security Platform

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 158. The malicious individual hopes that a client device, such as client device 104, will execute a copy of malware 158, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 164, as well as to receive instructions from C&C server 164, as applicable.

Suppose data appliance 102 has intercepted an email sent (e.g., by system 120) to client device 104 to which a copy of malware 158 has been attached. As an alternate, but similar scenario, data appliance 102 could intercept an attempted download by client device 104 of malware 158 (e.g., from a website). In either scenario, data appliance 102 determines whether a signature for the file (e.g., the email attachment or website download of malware 158) is present on data appliance 102. A signature, if present, can indicate that a file is known to be safe (e.g., is whitelisted), and can also indicate that the file is known to be malicious (e.g., is blacklisted).

If a signature for malware 158 (e.g., an MD5 hash of malware 158) is included in the set of signatures, data appliance 102 can prevent the transmission of malware 158 to client device 104 accordingly (e.g., by detecting that an MD5 hash of the email attachment sent to client device 104 matches the MD5 hash of malware 158). Security platform 122 can also provide to data appliance 102 a list of known malicious domains and/or IP addresses, allowing data appliance 102 to block traffic between enterprise network 140 and C&C server 164 (e.g., where C&C server 164 is known to be malicious). The list of malicious domains (and/or IP addresses) can also help data appliance 102 determine when one of its nodes has been compromised. For example, if client device 104 attempts to contact C&C server 164, such attempt is a strong indicator that client 104 has been compromised by malware (and remedial actions should be taken accordingly, such as quarantining client device 104 from communicating with other nodes within enterprise network 140).

If no signature for an attachment is found, in various embodiments, data appliance 102 is configured to provide the file for static/dynamic analysis, to determine whether it is malicious and/or to otherwise classify it. As one example, data appliance 102 can send a copy of malware 158 to security platform 122 for analysis. Security platform 122 can also (or instead) obtain copies of applications for evaluation from sources other than data appliance 102 (e.g., data appliances 136 and/or 148), and/or from other types of sources, such as a software distribution platform (also referred to herein as an "app store") 160. Example embodiments of app store 160 include Google Play, iOS App Store, Windows Store, and Amazon Appstore. In various embodiments, analysis of malware 158 is performed at least partially on premise (e.g., within enterprise network 140). And, analysis described herein as being performed by security platform 122 can also be performed, at least partially, by a malware analysis module included in data appliance 102.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliance 102 can be configured to automatically block the file download based on the analysis result. Further, a signature can be generated for the malware and distributed (e.g., to other data appliances such as data appliances 136 and 148) to automatically block future file transfer requests to download the file determined to be malicious.

In various embodiments, security platform 122 comprises one or more dedicated commercially available hardware servers (e.g., having multi-core processor(s), 16G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 8+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 (and/or to MDM server 162) as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 134 and 138, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software 114 on client device 110 which communicates with security platform 122 (e.g., to receive content packages from security platform 122 and transmit applications to security platform 122 for analysis).

Analyzing Samples Using Static/Dynamic Analysis

Figure 3:
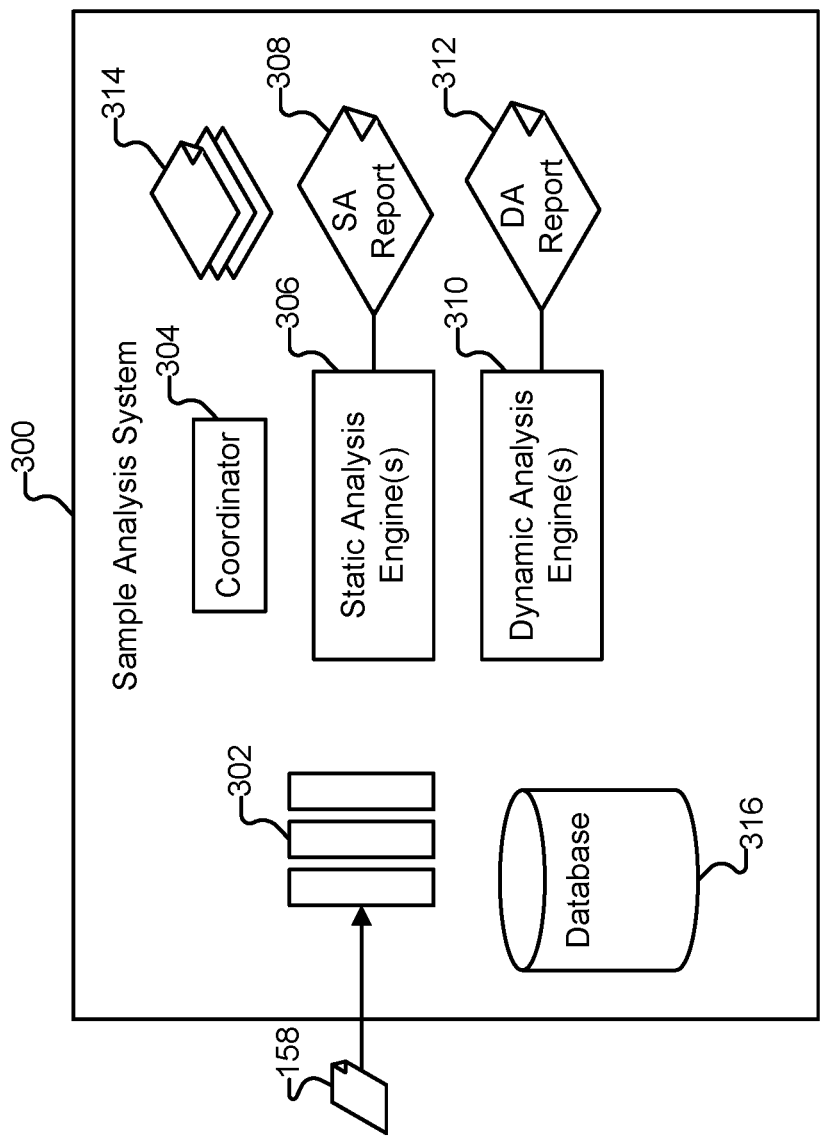
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

As will be described in more detail below, in various embodiments, analysis system 300 is configured to perform a two-part analysis on applications, including by performing static and dynamic analysis. The two-phase approach helps improve the accuracy of malware detection, while lowering the false positive rate of mislabeling benign applications as malware (e.g., due to harmless but poor programming techniques on the part of the application's author; due to including a common third party library, such as a legitimate advertising library, that requires permissions not otherwise used by the application; and/or due to legitimate uses of sensitive API calls).

Ingestion

In various embodiments, when a new sample is received for analysis (e.g., an existing signature associated with the sample is not present in analysis system 300), it is added to queue 302. As shown in FIG. 3, application 158 is received by analysis system 300 and added to queue 302.

Static Analysis

Coordinator 304 monitors queue 302, and as resources (e.g., a static analysis worker) become available, coordinator 304 fetches a sample from queue 302 for processing (e.g., fetches a copy of malware 158). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308).

Using an Android .apk file as an example of a sample being processed by analysis system 300, during the static analysis portion of the analysis, the sample (also referred to herein as a "host application" or "host APK") is reversed into a "reversed host application" (also referred to herein as a "reversed host APK"). The reversed host application is (in some embodiments) a directory structure (e.g., including one or more subdirectories) of source (and/or intermediate) code and resource files reversed from a given host application. In various embodiments, during static analysis, the structure of the APK file is examined (e.g., by reading the META-INF/CERT.SF) and parsing the DEX file format for classes.dex is performed.

Static analysis can be used to identify the presence of "sensitive code segments" in the APK. A sensitive code segment is one or more API calls (or other code elements) that involve a potentially sensitive/exploitable permission/resource. Examples in a mobile device context include sending SMS messages, capturing video, reading contacts, reading device location, reading device phone number, and installing a package. Other examples of sensitive code segments include (e.g., for Windows applications) checking the system registry, and (e.g., for Linux applications) attempting to modify init.rc.

The presence of a sensitive code segment in an APK indicates that the APK can potentially take a sensitive action/perform a sensitive function. A sensitive code segment can be present in an APK for a variety of reasons. As a first reason, the sensitive code segment may be included as a legitimate (and desired) behavior of a benign application. For example, a video editing application may legitimately require the ability to record video, and would accordingly include a sensitive code segment providing such functionality. A malicious application can also include a sensitive code segment. For example, a malicious flashlight application might be authored to include a sensitive code segment that allows the flashlight application to determine an unsuspecting device owner's location.

The mere presence of one or more sensitive code segments in an application is generally not dispositive of whether or not an application is malicious. As mentioned above, there are often legitimate (and desirable) reasons for such code segments to be included in an application. For example, a contact manager application will legitimately require access to a user's contacts in order to function. As another example, suppose an application author includes in an application a library (or toolkit, or other code, as applicable) that makes available a variety of functions (including sensitive ones). The application itself may not make use of all (or any) of the sensitive code segments included in the library. Flagging all applications which include sensitive code segments as malicious will generally result in a large number of false positives. In various embodiments, analysis system 300 evaluates the context in which a sensitive code segment is included in an application and uses the contextual information to help determine whether the application is malicious or not. Further, information collected by analysis system 300 can be exported as "evidence" to support verdicts about applications. For example, rather than merely labeling a particular application as "benign" or "malicious," evidence for reaching that verdict can be provided, such as, "malicious: application exports contacts without user interaction."

During static analysis, a call graph can be constructed and examined with respect to sensitive code segments. In particular, a determination can be made about how sensitive code segments can potentially be called (if at all) by an executing application, and heuristics can be employed to help determine whether an application is malicious or not. As one example, suppose an application includes a sensitive code segment, but according to the call graph the sensitive code segment is never called. As explained above, one reason for this is that the sensitive code segment is included in an SDK that is incorporated into the application, but the sensitive code segment itself is not used by the application. Such a non-executable sensitive code segment can be considered dead code, and the presence of the sensitive code in the application can be treated as benign accordingly. As another example, where the call graph for an application does indicate that sensitive code segments are called, the call path(s) to the sensitive code segment can be examined. If the sensitive code segment is only called in response to a user interaction, an assumption can be made that the user was aware of (and/or consented to) the sensitive behavior. If the sensitive code segment is instead called on startup (or otherwise executed without user input), an assumption can be made that the sensitive behavior is being hidden from the user (e.g., nefariously). A verdict (e.g., benign or malicious) can be assigned to each path to the sensitive code segment in the application during static analysis (e.g., based on how the code segment is called).

A previously mentioned, the static analysis engine can form an overall verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft XP SP 3 vs. Windows 7 SP 2, or iOS 9.0 vs. iOS 10.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

During the dynamic portion of the analysis, behaviors performed by the application are analyzed (e.g., to check whether the application uses its capabilities suspiciously/maliciously when executing). Heuristics can be used in conjunction with dynamic analysis to determine whether a particular behavior (e.g., when executed by a particular library) should be considered malicious. In various embodiments, static analysis results are used to customize dynamic analysis. For example, if static analysis reveals that user interactions are required to trigger a sensitive code segment, such interactions can be simulated during dynamic analysis.

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities. Such connections can also be used for other purposes, such as to help classify the application (e.g., an application that streams data from site 152 can be classified as a video streaming app, and an application that communicates with site 150 can be classified as a pornographic app (irrespective of other features it might provide, such as a calculator widget)).

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Example Process Performed by Sample Analysis System

Figure 4:
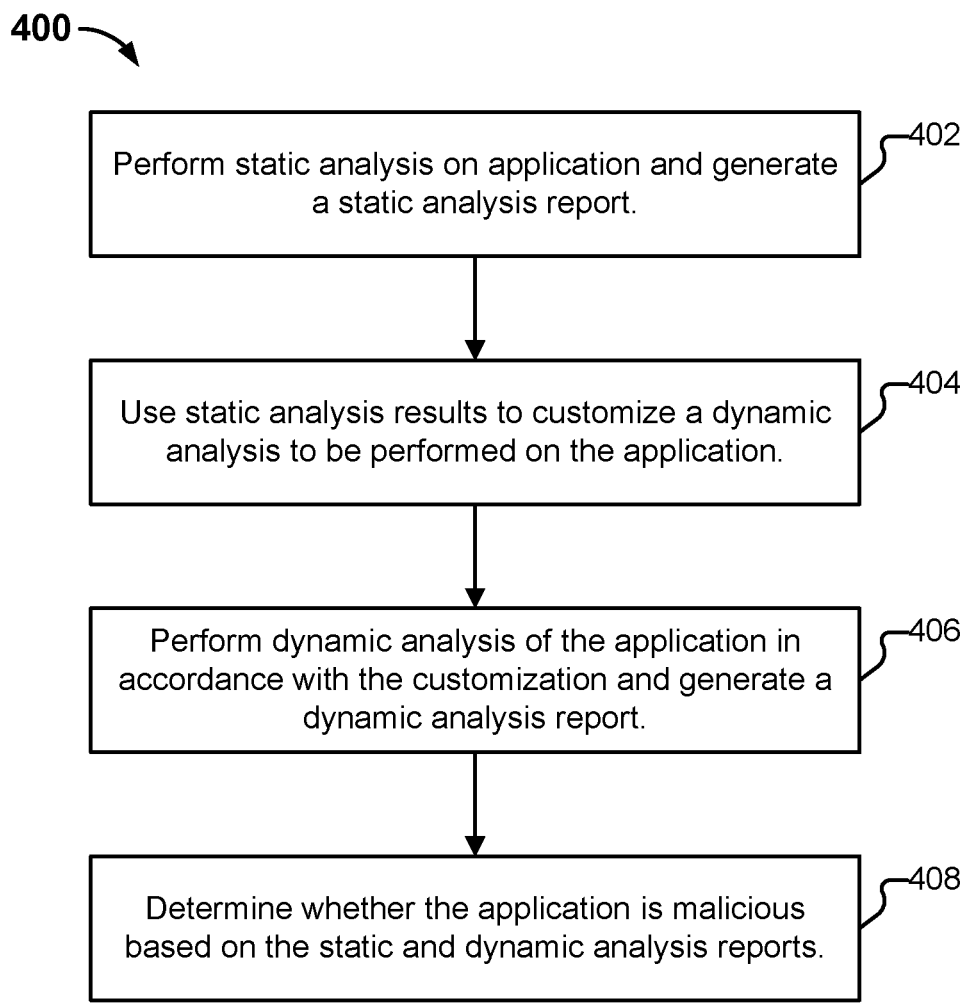
FIG. 4 illustrates an embodiment of a process for determining whether a sample is malicious.

FIG. 4 illustrates an embodiment of a process for determining whether a sample is malicious. In various embodiments, process 400 is performed by analysis system 300. The process begins at 402 when static analysis is performed on a sample. As one example, static analysis is performed on "game.apk" by a static analysis engine 306 at 402. Suppose "game.apk" is malicious and will delete all of the SMSes in a user's Inbox if the device it is running on receives an SMS from ChinaMobile's service number (e.g., "10086"). The application does this to hide notifications pertaining to phone billing from the end user, so that the end user will not be alerted to atypical spending patterns (e.g., premium SMS purchases). During static analysis, a determination will be made that the game.apk application has access to SMS content. This capability of the application (along with other information, examples of which are provided above) is included in a static analysis report by the static analysis engine. At 404, the static analysis report is used to customize a dynamic analysis to be performed on the sample. As one example, since the application has access to SMS content, the dynamic analysis will be customized to include sending a variety of SMS messages. Other device resources to which the application does not have access (e.g., GPS location information) are not simulated (in various embodiments), for efficiency, and thus can be excluded from the customized dynamic analysis plan. At 406, dynamic analysis of the application is performed using a dynamic analysis engine. One example of the dynamic analysis performed includes sending SMSes appearing to originate from a variety of sources, including 10086 (i.e., the service number of ChinaMobile) to the emulator. Sending such an SMS is an example of an "external event" (as is a simulated location change)—contrasted with an "internal event" (e.g., where button presses or file opens/closes are simulated). When game.apk deletes the SMS Inbox upon receiving the simulated incoming SMS from ChinaMobile, the game.apk's actions will be captured and logged. The dynamic analysis engine will examine the logged behavior in conjunction with creating a dynamic analysis report—and determine that the application has taken a malicious action with respect to SMS messages.

Finally, at 408 a determination is made as to whether the sample application is malicious, based on the static and dynamic analysis reports. In this example, coordinator 304 examines the static analysis report (concluding that the application is "suspicious") and dynamic analysis report (concluding the application is "malicious") and determines that game.apk is malicious. In some cases, static analysis engine 306 might conclude an application is malicious, while dynamic analysis engine 310 might conclude the application is merely suspicious. In various embodiments, the final decision rendered by analysis system 300 uses the more severe of the two assessments (e.g., concluding the application is malicious based on the static analysis report). In various embodiments, the final verdict is determined by coordinator 304 assigning points to each of the features triggered by the application (i.e., both the static features and the dynamic features). If the score exceeds a threshold, the application is determined to be malicious. More sophisticated scoring rubrics can also be used in conjunction with the techniques described herein, such as ones which weight dynamic analysis results more heavily than static analysis results.

In some embodiments, coordinator 304 (or another appropriate component) is configured to revise one or more heuristics based on process 400. As one example, static analysis engine 306 might determine that a given application is configured to send an SMS message, but static analysis engine 306 is unable to determine whether the SMS is in fact malicious (e.g., to a 900 number). One reason static analysis engine 306 might not know that the SMS is malicious is because the number is encoded in a way not previously seen by analysis system 300. Another reason static analysis engine 306 might not know the SMS is malicious is because the number is fetched from a URL included in the application (but not known to analysis system 300 to be a malicious URL). During dynamic analysis of the application, a determination might be made that the number to which the SMS is sent is in fact malicious (e.g., by comparing log information against a collection 314 of malicious/premium numbers). The static analysis rules can be revised to indicate that, in the future, if the encoded information representing the 900 number is encountered in any new applications, those applications are malicious (rather than suspicious). As another example, collection 314 can be refined to include the URL as known malicious. When a future application is evaluated by static analysis engine 306 that includes the URL, the static analysis engine will conclude that the application is malicious (instead of suspicious) based on the presence of the URL in collection 314.

Classifying URLS

As previously mentioned, one task performed by security platform 122 is URL categorization. As shown in FIGS. 1 and 2C, in various embodiments, security platform 122 includes a URL classification service 276. URL classification service 276 uses a set of crawlers 280 to crawl sites (e.g., sites 150-156), extract metadata/content, and store information associated with the crawled sites in database 282. Examples of tools that can be used to crawl/extract content from sites include PageDump (WebKit), HtmlUnit, and jsoup. Database 282 is, in various embodiments, implemented using MongoDB. Example tables that can be included in database 282 are a crawl queue (of sites to be crawled), a crawl log (a history of sites crawled), a classification result (e.g., a to-publish category, invalid site, or no category), and a crawl content report (e.g., a summary of crawled sites, language, and number of pages crawled). The information extracted for a site (e.g., title, description, body text, keywords, inlinks, outlinks, language, etc.) is used (e.g., by classifier 284) to generate a feature vector (or set of feature vectors, as applicable). One example of a feature is whether or not any of the outlinks of a site lead to sites known to be classified as ADULT sites. Other example features variously include features related to body text, features related to metadata, features related to incoming links, and features related to the URL itself.

In various embodiments, different features included in a feature vector are used in conjunction with different types of machine learning approaches incorporated into a classification model, such as model 286. Examples of such machine learning approaches include Naive Bayes, support vector machines, random forest, logistic regression, and gradient descent boosting trees. Classifier 284 uses a model, such as model 286, to classify a given site (e.g., as NEWS, ADULT, etc.) based on its associated feature vector. In various embodiments, a model such as model 286 is trained using a training set of manually labeled websites. As one example, sites such as netflix.com, hulu.com, and youtube.com (well known to provide video streaming services) can be included in the training set (labeled as "video streaming"). Categorizations determined using model 286 are stored in database 282. The contents of database 282 can be used for a variety of purposes, including generating database 262, and responding to queries.

In various embodiments, URL classification service 276 is implemented using commodity server-class hardware. URL classification service 276 can also be constructed using a scalable, elastic architecture, and may comprise several distributed components, including components provided by one or more third parties (e.g., using Amazon Web Services, Microsoft Azure, and/or Google Cloud Platform). Further, when URL classification service 276 is referred to as performing a task, such as storing data or processing data, it is to be understood that a sub-component or multiple sub-components of URL classification service 276 (whether individually or in cooperation with third party components) may cooperate to perform that task. Unless otherwise specified, various logical components of URL classification service 276 are generally implementable in a variety of ways, including as a set of one or more scripts (e.g., written in Java, python, etc., as applicable).

Handling Encrypted/Encoded Communications

As previously mentioned, in various embodiments, data appliance 102 includes one or more cryptographic engines 206 which can perform encryption and decryption operations as applicable (e.g., providing for SSL decryption (240) and/or SSL encryption (246)). Unfortunately, in some cases, it may not be possible for a data appliance to decrypt traffic. As a first example, the data appliance may lack a cryptographic engine 206 (and/or the functionality described herein as being provided by cryptographic engine 206 may be omitted). As a second example, a policy (e.g., among policies 242) may prevent the use of decryption engine 240 (e.g., regarding the traffic of a particular user/group of users or destined for a particular destination, such as for privacy or compliance reasons). As a third example, experimental transport layer network protocols are increasingly being used (e.g., for communications between client devices and servers) which may be incompatible with cryptographic engine 206. One example of such a transport layer network protocol is Quick UDP Internet Connection (QUIC), which supports secure multiplexed connections over UDP. In contrast to TCP/IP packets, QUIC packets associated with a video streaming application may appear indistinguishable (e.g., to a traditional firewall) from QUIC packets associated with a web mail application. Accordingly, an organization attempting to enforce policies against such packets using traditional techniques could have to take an all-or-nothing approach (e.g., banning all QUIC traffic or allowing all QUIC traffic), instead of being able to enforce more granular policies (e.g., allowing web mail application traffic and blocking, throttling, or otherwise managing video streaming application traffic). Using techniques described herein, however, embodiments of data appliance 102 are able to enforce granular policies regarding encrypted/encoded traffic, including QUIC traffic as well as other types of traffic (which may not be decryptable/decodable by cryptographic engine 206).

In the following example, suppose that ACME has corporate policies that prohibit employees from using web-based document collaboration tools (e.g., Google Docs and Microsoft Word Online), that permit employees to use web-based email services (e.g., Gmail and Yahoo! Mail), and ask that employees limit their usage of video streaming services (e.g., YouTube and Amazon Instant Video) during peak business hours (e.g., 9 am-5 pm). As previously explained, such policies can be enforced by embodiments of data appliance 102. As examples, TCP/IP-based communications between clients and such services can be processed by application identification engine 116 (e.g., to identify which type of service a user of enterprise network 140 is attempting to access), and data appliance 102 can take appropriate actions such as allowing or denying such communications. As will be described in more detail below, such policies can also be enforced even in the event communications between client devices (e.g., client device 106 or 108) and such resources (e.g., video streaming website 152) are encrypted and/or make use of protocols (e.g., for which cryptographic engine 206 is not usable).

Figure 5:
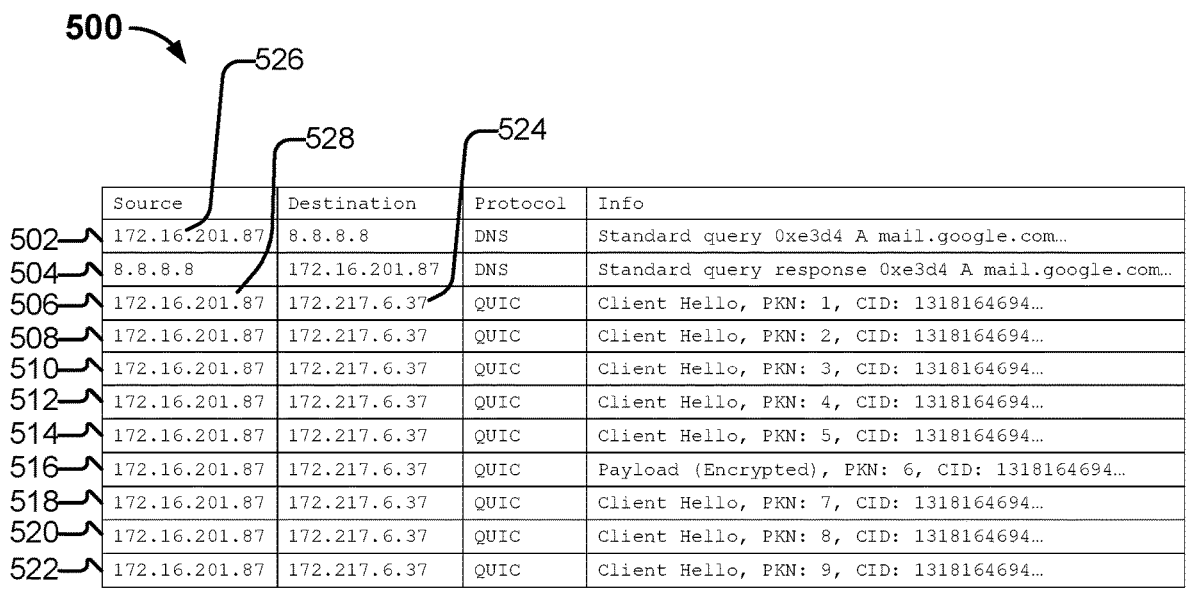
FIG. 5 depicts an example of captured network activity.

FIG. 5 depicts an example of captured network activity. In particular, activity 500 corresponds to sequential pcap data captured by data appliance 102 (and stored, for example, on disk as a log file and/or in RAM). Line 502 corresponds to a DNS request, made by Bob (using a web browser on client device 106) for the domain mail.google.com. Line 504 corresponds to the response (from DNS server 8.8.8.8). Lines 502 and 504 can be considered as part of a first session—a DNS request. Lines 506-522 (forming an initial part of a second session) correspond to communications made between client device 106 and a server (reachable via the IP address, 172.217.6.37) using the QUIC protocol. The QUIC protocol is used (e.g., by Google) to exchange data in conjunction with multiple types of applications (e.g., video streaming and web mail). The packets associated with lines 506-522 are encrypted, and a traditional firewall (or similar appliance) would be unable to determine whether a given QUIC packet carries video data, or web mail data. In contrast, data appliance 102 (using techniques described herein) can enforce granular, application-specific policies regarding session traffic even where it is unable to decrypt/decode network traffic. In particular, and as will be described in more detail below, data appliance 102 is able to correlate DNS requests (e.g., made for mail.google.com) and responses (e.g., 172.217.6.37), with the QUIC (or other) activity (e.g., represented by lines 506-522). And, data appliance 102 can use the correlation to enforce policies.

As previously mentioned, in various embodiments, data appliance 102 is configured to provide DNS functionality/DNS resolution capabilities, and/or to act as a DNS resolver for a client. For example, in various embodiments, data appliance 102 executes a DNS proxy service 166. The DNS proxy service can be used by data appliance 102 to correlate DNS lookup information (e.g., a mapping between an IP address and a hostname) with a session and enforce an appropriate policy against the session (e.g., based on an application identification associated with the session).

When Bob attempts to access mail.google.com (site 168) using his browser on client device 106, a DNS request is received by DNS proxy service 166, which provides a response back to client device 106. As applicable, the response is cached (as described in more detail below). A new QUIC session is then established by client device 106.

The presence of Bob's IP address (172.16.201.87) as a source in both the DNS request (526) and QUIC traffic (528), and the presence of site 168's IP address (172.217.6.37) as both the destination IP address of client 106's QUIC session and a DNS response (e.g., stored in caches 270/272 or otherwise returned by the DNS proxy service) can be correlated. In particular, APP-ID engine 116 can use the information to conclude that packets 506-522 are web mail packets and enforce an appropriate policy as a result.

In some embodiments, DNS resolution performed by data appliance 102 is implemented using a distributed DNS cache comprising specific DNS caches on the data plane (270) and management plane (272) which parallel the URL categorization caches described above. The distributed DNS cache is populated/updated through two main mechanisms. The first is through client DNS requests to proxy 166 prior to a session being established. In this scenario, clients pre-populate cache 272. For example, a client would first send a DNS query for mail.google.com. Once resolved (e.g., to 172.217.6.37), the client would initiate a QUIC session with 172.217.6.37. In that case, a mapping between mail.google.com and 172.217.6.37 should be in the DNS proxy cache 272 on the management plane. This ensures that when data plane 234 needs to resolve mail.google.com, it should be a low latency query as opposed to sending to an external DNS server. A second source of cache population is through a DNS lookup by data appliance 102 itself either through proxy 166 or a configured DNS server (e.g., DNS server 132) while the session is ongoing. Results are cached in the distributed cache for the lifetime of the TTL (where the TTL value is the value used by the upstream DNS).

In various embodiments, for a given session, if DNS results are not available (e.g., are not cached, or if the results have expired), enforcement of a policy against the session will be best effort. This means that data appliance 102 will allow packets, and mark the encrypted session as pending classification. For packets that follow, "post validation" can be performed with the IP address of the resource. If DNS results implicating the IP address arrive before the session ends, classification can be performed, and appropriate treatment of the session can be made by data appliance 102 based on the classification (e.g., terminating the session, marking the session with the classification, etc.). In some embodiments, data appliance 102 (or portions thereof) is virtualized, with multiple virtualizations present on the same system. In such a situation, proxy 166 can be shared across all virtual systems, or DNS proxy settings can be localized to a specific virtual system, if desired.

Figure 6:
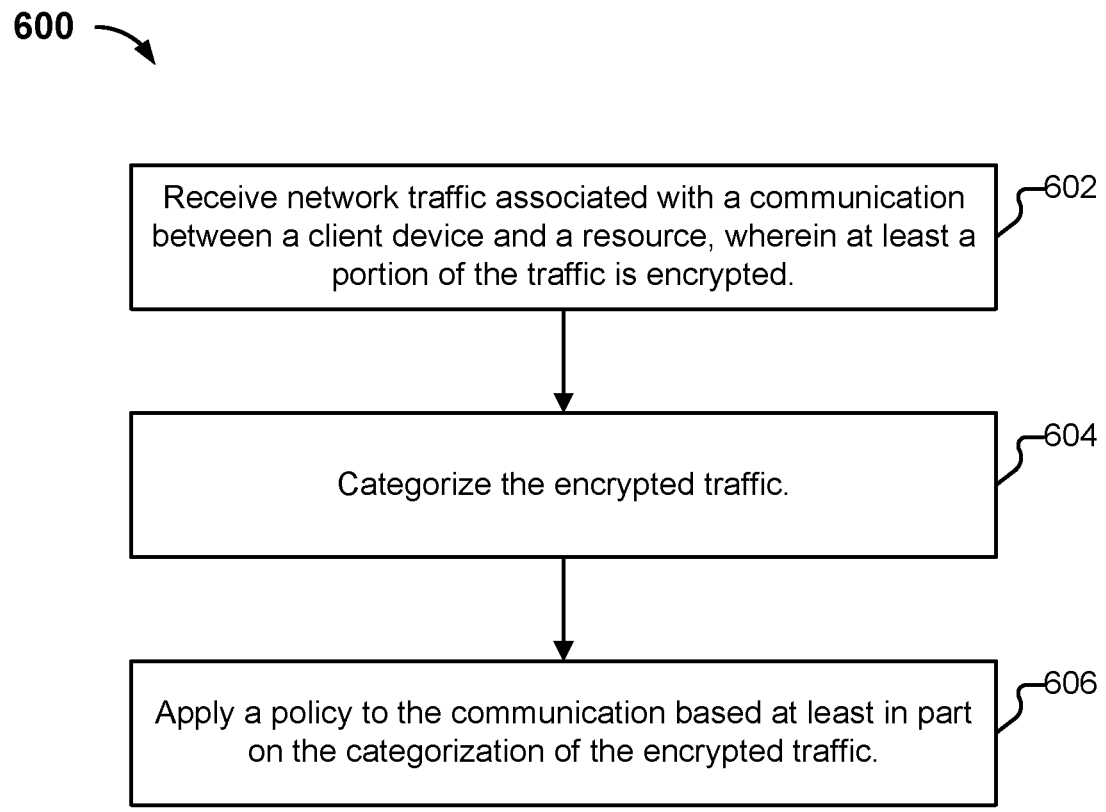
FIG. 6 illustrates an embodiment of a process for enforcing a policy against a communication.

FIG. 6 illustrates an embodiment of a process for enforcing a policy against a communication. In various embodiments, process 600 is performed by data appliance 102. Process 600 begins at 602 when encrypted network traffic associated with a communication between a client device and a resource is received. As one example, data appliance 102 can receive such encrypted network traffic at 602 when Bob's client device 106 attempts to connect with site 168 using QUIC (e.g., as depicted in line 506 of FIG. 5). The encrypted network traffic can be received passively (e.g., with data appliance 102 passively monitoring network activity) and can also be received actively, as applicable.

At 604, the encrypted traffic is categorized. As one example of the processing performed at 604, data appliance 102 compares an IP address associated with the encrypted network traffic (e.g., the IP address indicated in region 524 of FIG. 5) against unencrypted traffic associated with the encrypted traffic. One example of such unencrypted traffic is DNS lookup data. A variety of approaches can be used to obtain the DNS lookup data. As a first example, answers to DNS requests recently made by the client device can be examined for IP addresses that match the IP address of the resource. As a second example, answers to DNS requests recently made by other client devices (e.g., devices 108 and 104) can also/instead be examined for IP addresses that match the IP address of the resource (e.g., unexpired matches found for the IP address in caches 270/272). As a third example, in various embodiments, data appliance 102 is configured to perform a reverse DNS lookup for the IP address, and thereby, in some cases, obtain (reverse) DNS lookup data. The obtained DNS data can be used to determine a categorization for the traffic, such as by using it to query URL database 262. The categorization of the DNS data can then be used to impute a categorization to the encrypted session data.

At 606, a policy is applied to the session based on the categorization determined at 604. As one example, Bob's session with site 168 can be allowed (e.g., by data appliance 102) to continue, as it corresponds to web-mail activity, which is a permitted activity per ACME policies (e.g., as represented in policies 242).

Suppose that Bob now attempts to connect to docs.google.com (against ACME corporate policy). Data appliance 102 will observe a DNS request/response (e.g., resolving docs.google.com to 173.194.67.100), and then observe encrypted QUIC traffic between client device 106 and a server reachable at 173.194.67.100 (at 602). At 604, data appliance 102 can correlate the DNS information, client device 106's IP address (as a requestor of the DNS information, and as a source), and the IP address 173.194.67.100 (as a response to the DNS query, and as a destination) to classify the session between client device 106 and server 173.194.67.100 as being "document collaboration." And, at 606, data appliance 102 can take a remedial action, such as ending the session, alerting Bob that his actions are not permitted, etc.

Additional Detail

The following are examples of hostnames used by site 168: gmail.com, and mail.google.com. Any attempts by a client device to access content via one of the hostnames (whether the traffic is encrypted or not, irrespective of protocol, etc.) can be categorized (e.g., by APP-ID engine 116 at portion 604 of process 600) as being "web mail" related.

The following are examples of hostnames used by a document collaboration site: 0.docs.google.com, docs.google.com, and drive.google.com. Any attempts by a client device to access content via one of these hostnames (whether the traffic is encrypted or not, irrespective of protocol, etc.) can be categorized (e.g., by APP-ID engine 116 at portion 604 of process 600) as being "document collaboration" related.

And, the following are examples of hostnames used by site 152 (and e.g., selected for use based on load balancing, geographical region, etc.): r1-sn-o097zn16.googlevideo.com, r3-sn-nx5e6nes.googlevideo.com, r6-sn-n4v7sne7.gvt1.com, r13-sn-n4v7kn7y.gvt1.com, r13-sn-nx57yn76.gvt1.com, r17-sn-o097zned.gvt1.com, r17-sn-o097znez.googlevideo.com, r20-sn-o097znls.googlevideo.com, and www.youtube-nocookie.com. Any attempts by a client device to access content via one of these hostnames (whether the traffic is encrypted or not, irrespective of protocol, etc.) can be categorized (e.g., by APP-ID engine 116 at portion 604 of process 600) as being "video streaming" related.

As previously mentioned, database 262 can be periodically refreshed/maintained, such as by security platform 122 transmitting daily (or another timescale) database updates to data appliance 102 (e.g., as a content package). Accordingly, as it is discovered that an additional host (e.g., "r20-sn-oX97znls.googlevideo.com") is being used by a site (e.g., site 152), such host and its classification (e.g., "video streaming") can be included in updates to database 262, and then also used (e.g., by data appliance 102 in conjunction with process 600) to categorize encrypted traffic.

One way that additional domains (and their classifications) can be discovered/determined is by collecting and processing DNS query/response information. Such information (e.g., collected by data appliances 136 and 148) can be provided to security platform 122, which can use the information to improve static/dynamic analysis results, and also to improve the efficacy of data appliance 102.

Another way that additional hosts (and their classifications) can be discovered/determined is through static/dynamic analysis of applications performed by security platform 122. Such static and dynamic analysis can be used to identify domains associated with/used by particular applications, whether benign or malicious. As previously mentioned, applications sometimes make use of SDKs, libraries, etc. to provide functionality. Further, as also previously mentioned, in various embodiments, information such as hard-coded domains/IPs is collected during static analysis, and/or information about external network activity is collected during dynamic analysis (e.g., by sample analysis system 300). Also as previously mentioned, in various embodiments, the environment used by analysis system 300 is instrumented/hooked such that behaviors observed while a sample is being executed are logged as they occur (e.g., using a customized kernel that supports hooking and logcat), and network traffic associated with the emulator is also captured (e.g., using pcap).

Various information collected by analysis system 300 (e.g., during static/dynamic analysis) can be used to classify resources used by a given application. In particular, even where the application makes use of end-to-end encryption, the hooked/customized execution environment allows sample analysis system 300 to observe, e.g., when a user's contacts are collected within an app or the user's location is collected within the app, and the sensitive information transmitted to a remote server. In various embodiments, sample analysis system 300 is configured to associate a particular behavior with a particular host as a classification. The classification can then be used (e.g., by data appliance 102) to enforce a policy.

As a first example, suppose that during dynamic analysis, sample analysis system 300 observes a sample uploading device information (e.g., IMEI, MAC addresses, location information) to server 170 (e.g., in an encrypted payload). Security platform 122 can associate server 170 with the data leak behavior and include a mapping between server 170 and a classification of "data leak" in database 262. If a copy of the application is later executed within network 140 (e.g., installed on tablet 108), data appliance 102 can block transmission of data from tablet 108 to server 170, preventing data leakage.

As a second example, suppose that a popular secure chat application (offering end-to-end encryption) also includes a particular advertising library. During static and dynamic analysis of the application, sample analysis system 300 can determine which resources are used for the exchange of messages (e.g., server1.examplechat.com, server2.examplechat.com), and which resources are used by the advertising library to serve advertisements (e.g., *.exampleadserver.biz). The resources can be categorized (e.g., as "secure messaging" and "advertising") and included by security platform 122 in classified site database 282. ACME can have policies (e.g., as policies 242) that allow secure messaging applications, prevent cryptographic engine 206 from decrypting messages of those applications, and also deny advertising applications. Such policies can be enforced by data appliance 102 in accordance with techniques described herein (e.g., using process 600). In this example, when a client (e.g., client 108) sends messages using the secure messaging app, such traffic will be received by data appliance 102 at 602. At 604, the encrypted traffic is categorized and policies can be accordingly applied (606). Namely—connections between client 108 and server1.examplechat.com, server2.examplechat.com represent encrypted messages and are allowed by data appliance 102. And, any connections between client 108 and, e.g., ads.exampleadserver.biz, can be blocked.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic collectively associated with a set of communications made between a client device and a respective first and second resource during a usage of a program executed on the device wherein at least a portion of the monitored network traffic is encrypted;
determine an identifier associated with the second resource comprising at least one of an Internet Protocol (IP) address and a domain name;
use the determined identifier to categorize at least a portion of the monitored encrypted traffic as pertaining to a particular category of an application type based at least in part on a previously determined categorization of the second resource made at least in part during at least one of a static analysis or a dynamic analysis performed on an application, wherein, during the at least one of the static analysis or the dynamic analysis performed on the application, an external resource used by the application is determined, and wherein the category of the application type is based at least in part on a categorization of a type of service provided by the external resource; and
apply a first policy to a first communication, wherein the first communication is made between the client device and the first resource during the usage of the program and apply a second policy to a second communication, wherein the second communication is made between the client device and the second resource during the usage of the program, wherein the second policy is different from the first policy and wherein the second policy is based at least in part on the categorization of the encrypted traffic; and
a memory coupled to the processor and configured to provide the processor with instructions.

2. The system of claim 1, wherein the processor is configured to categorize the at least a portion of the monitored encrypted traffic based at least in part on a Domain Name System (DNS) query performed by the client device.

3. The system of claim 1, wherein the processor is configured to categorize the at least a portion of the monitored encrypted traffic based at least in part on a cached result of a Domain Name System (DNS) query previously performed by a device that is different from the client device.

4. The system of claim 1, wherein the processor is configured to categorize the at least a portion of the monitored encrypted traffic based at least in part on unencrypted network traffic associated with the encrypted network traffic.

5. The system of claim 1, wherein the processor is further configured to transmit the identifier of the second resource to a categorization service.

6. The system of claim 1, wherein the processor is further configured to cache an association between the IP address and the domain name.

7. The system of claim 1, wherein the processor is further configured to cache an association between the IP address and the categorization of the second resource.

8. The system of claim 1, wherein the network traffic comprises Quick UDP Internet Connection (QUIC) traffic.

9. The system of claim 1, wherein the processor is configured to categorize the at least a portion of the monitored encrypted traffic at least in part by correlating the IP address associated with the encrypted traffic and an IP address returned as a result of a Domain Name System (DNS) query, wherein the DNS query result is received at a first time and wherein the encrypted traffic is received at a second time that occurs after the first time.

10. The system of claim 1, wherein the processor is configured to categorize the at least a portion of the monitored encrypted traffic at least in part by performing a reverse Domain Name System (DNS) lookup on an IP address associated with the encrypted traffic.

11. The system of claim 1, wherein an attempt is being made to transmit the encrypted traffic to a resource previously determined to receive leaked data and wherein applying the second policy to the communication includes blocking the communication.

12. The system of claim 1, wherein the application type is a secure messaging application type and the categorization of the second resource is as a secure messaging platform.

13. The system of claim 12, wherein an attempt is being made to transmit encrypted traffic to a resource previously determined to serve advertisements and wherein applying the second policy to the communication includes blocking the communication.

14. A method, comprising:
monitoring network traffic collectively associated with a set of communications made between a client device and a respective first and second resource during a usage of a program executed on the device wherein at least a portion of the monitored network traffic is encrypted;
determining an identifier associated with the second resource comprising at least one of an Internet Protocol (IP) address and a domain name;
using the determined identifier to categorize at least a portion of the monitored encrypted traffic as pertaining to a particular category of an application type based at least in part on a previously determined categorization of the second resource made at least in part during at least one of a static analysis or a dynamic analysis performed on an application, wherein, during the at least one of the static analysis or the dynamic analysis performed on the application, an external resource used by the application is determined, and wherein the category of the application type is based at least in part on a categorization of a type of service provided by the external resource; and
applying a first policy to a first communication, wherein the first communication is made between the client device and the first resource during the usage of the program, and applying a second policy to a second communication, wherein the second communication is made between the client device and the second resource during the usage of the program, wherein the second policy is different from the first policy and wherein the second policy is based at least in part on the categorization of the encrypted traffic.

15. The method of claim 14, wherein categorizing the at least a portion of the monitored encrypted traffic is based at least in part on a Domain Name System (DNS) query performed by the client device.

16. The method of claim 14, wherein categorizing the at least a portion of the monitored encrypted traffic is based at least in part on a cached result of a Domain Name System (DNS) query previously performed by a device that is different from the client device.

17. The method of claim 14, wherein categorizing the at least a portion of the monitored encrypted traffic is based at least in part on unencrypted network traffic associated with the encrypted network traffic.

18. The method of claim 14, further comprising transmitting the identifier of the second resource to a categorization service.

19. The method of claim 14, further comprising caching an association between the IP address and the domain name.

20. The method of claim 14, further comprising caching an association between the IP address and the categorization of the second resource.

21. The method of claim 14, wherein the network traffic comprises Quick UDP Internet Connection (QUIC) traffic.

22. The method of claim 14, wherein categorizing the at least a portion of the monitored encrypted traffic includes correlating the IP address associated with the encrypted traffic and an IP address returned as a result of a Domain Name System (DNS) query, wherein the DNS query result is received at a first time and wherein the encrypted traffic is received at a second time that occurs after the first time.

23. The method of claim 14, wherein an attempt is being made to transmit the encrypted traffic to a resource previously determined to receive leaked data and wherein applying the second policy to the communication includes blocking the communication.

24. The method of claim 14, wherein the application type is a secure messaging application type and the categorization of the second resource is as a secure messaging platform.

25. The method of claim 24, wherein an attempt is being made to transmit the encrypted traffic to a resource previously determined to serve advertisements and wherein applying the second policy to the communication includes blocking the communication.

26. The method of claim 14, wherein categorizing the at least a portion of the monitored encrypted traffic includes performing a reverse Domain Name System (DNS) lookup on an IP address associated with the encrypted traffic.

27. A computer program product embodied in a non-transitory computer readable storage medium and comprising computer instructions for:
monitoring network traffic collectively associated with a set of communications made between a client device and a respective first and second resource during a usage of a program executed on the device wherein at least a portion of the monitored network traffic is encrypted;

determining an identifier associated with the second resource comprising at least one of an Internet Protocol (IP) address and a domain name;

using the determined identifier to categorize at least a portion of the monitored encrypted traffic as pertaining to a particular category of an application type based at least in part on a previously determined categorization of the second resource made at least in part during at least one of the static analysis or the dynamic analysis performed on an application, wherein, during the at least one of a static analysis or a dynamic analysis performed on the application, an external resource used by the application is determined, and wherein the category of the application type is based at least in part on a categorization of a type of service provided by the external resource; and applying a first policy to a first communication, wherein the first communication is made between the client device and the first resource during the usage of the program, and applying a second policy to a second communication, wherein the second communication is made between the client device and the second resource during the usage of the program, wherein the second policy is different from the first policy and wherein the second policy is based at least in part on the categorization of the encrypted traffic.

* * * * *